United States Patent [19]
Tjønneland

[11] Patent Number: 5,995,702
[45] Date of Patent: Nov. 30, 1999

[54] SIDE RADIATING CABLE WITH INCREASED LIGHT OUTPUT

[75] Inventor: Søren Tjønneland, Sindal, Denmark

[73] Assignee: Roblon A/S, Frederikshavn, Denmark

[21] Appl. No.: 09/056,144

[22] Filed: Apr. 7, 1998

[30] Foreign Application Priority Data

Apr. 8, 1997 [EP] European Pat. Off. ............. 97105792

[51] Int. Cl.[6] ................................................ G02B 6/04
[52] U.S. Cl. .................... 385/901; 385/115; 385/120; 385/124; 362/554; 362/556; 362/560
[58] Field of Search .................................. 385/901, 115, 385/116, 120, 121, 124, 100–114; 362/554, 556, 560

[56] References Cited

U.S. PATENT DOCUMENTS

| | | | |
|---|---|---|---|
| 4,907,132 | 3/1990 | Parker | 362/556 |
| 5,183,323 | 2/1993 | Daniel | 362/556 |
| 5,249,105 | 9/1993 | Koizumi | 362/556 |
| 5,333,228 | 7/1994 | Kingstone | 385/100 |
| 5,345,531 | 9/1994 | Keplinger et al. | 385/102 |
| 5,568,964 | 10/1996 | Parker et al. | 362/556 |
| 5,617,496 | 4/1997 | Kingstone | 385/100 |
| 5,617,497 | 4/1997 | Kinstone | 385/100 |

FOREIGN PATENT DOCUMENTS

| | | |
|---|---|---|
| 0291023A2 | 11/1988 | European Pat. Off. . |
| 0498621A2 | 8/1992 | European Pat. Off. . |
| 58-195804 | 11/1983 | Japan . |
| 60-177309 | 9/1985 | Japan . |
| 2108007 | 4/1990 | Japan . |

OTHER PUBLICATIONS

Translation of German Search Report dated Oct. 14, 1997 relating to European Patent Application No. 97105792.2.
German Search Report dated Oct. 14, 1997 relating to European Application No. 97105792.2.

*Primary Examiner*—Phan T. H. Palmer
*Attorney, Agent, or Firm*—Howard & Howard

[57] ABSTRACT

In order to enhance the light output from a side illuminating optical structure comprising a plurality of elongate optical fibers, means is provided for ensuring a permanent compressive stress in the optical structure, for example a permanent compressive stress in the radial direction and/or in the axial direction. A variety of means are disclosed, for example a transparent tape member wound with tension helically around the optical structure, an elongate heat-shrinkable sleeve surrounding the structure, a plurality of rings provided along the structure to keep it under permanent compressive stress. Embodiments using braids are also disclosed.

34 Claims, 9 Drawing Sheets

SIDE RADIATING CABLE WITH INCREASED LIGHT OUTPUT

FIELD OF THE INVENTION

The present invention relates to a side illuminating optical structure comprising a plurality of elongate optical fibers, each having a core of a first plastic material having a first refractive index and a cladding of a second plastic material having a second refractive index lower than said first refractive index, said fibers being cabled about a common core to form an optical cable, wherein said common core may be an optical fiber or a group of optical fibers or a cable of optical fibers or another elongate structure such as a tube, a rope or a plurality of filaments or reinforcing members.

DESCRIPTION OF PRIOR ART

Optical fibers are frequently used for the transmission of signals from one location to another. Such optical fibers are intended to minimize the light loss from the side of the fiber because such light loss constitutes a loss of signal information, which is undesirable.

Another use of optical fibers has developed, in which the intention is to lose light from the side surface of the fibers to achieve a side illuminating optical structure comprising a plurality of elongate optical fibers. Side illuminating optical structures have many uses such as illuminating the outlines of buildings or advertisements, strip lighting around swimming pools and in aircraft aisles and use in advertising displays, for example in place of neon tubes or signs.

Optical fibers of the type used for side illuminating optical structures typically have a core of a first plastic material, having a first refractive index and a cladding of a second plastic material having a second refractive index lower than the first refractive index. They are generally of a larger diameter than optical fibers intended for signal transmission. Such plastic fibers are available from a number of sources, typically with diameters of about 0.75 to 1.5 mm.

Various techniques have been proposed to generate light loss from the side of such optical fibers. The propagation of light along an optical fiber normally takes place by total internal reflection at the interface between the core and the cladding. Some of the earlier proposals for promoting light loss from the side of optical fibers involved dispersing fine particles or bubbles in the plastic material of the optical fibers. These particles or bubbles are intended to act as scattering centers and scatter light at angles such that it can leave the fiber through the side wall thereof.

One interesting specification in this field is U.S. Pat. No. 4,885,663, which explains that the light entering from one end of an optical fiber normally passes out the other end thereof after a certain amount of loss has taken place. It is stated that if the surface of the optical fiber is disrupted, e.g. by scratching, or otherwise deformed, e.g. by bending the optical fiber at a plurality of discrete locations along its length, such that the angle of bend approximately exceeds the angle of internal reflection, then light will be emitted at these locations.

U.S. Pat. No. 4,885,663 also states that a plurality of optical fibers can be twisted together to form a multi-strand optical fiber, with the advantage that a light emitting panel is easier to make utilizing such multi-strand optical fibers because it is much easier to bend the optical fibers to the extent necessary to cause light to be emitted from the optical fibers in the light emitting section.

It is also stated in this reference that a plurality of optical fibers such multi-strand optical fibers may be wrapped around a plastic or fiber core and/or coated with a suitable plastic material to form multi-strand optical fiber cables. The reference also includes the proposal that the core should be used as a back reflector.

The concept of bending an optical fiber to produce light loss from the side of the fiber is disclosed in various references. For example, Japanese patent public disclosure HEI 2-108007 of Sumitomo Electrical Industry Ltd., published on Apr. 19th, 1990, proposes a side illuminating optical structure in which a plurality of optical fibers are twisted around a central member and a sheath of a material capable of transmitting the wavelength of the visible light in the core of each optical fiber is provided outside the twisted optical fibers.

The Japanese specification explains that there is a relationship in ordinary optical fibers in accordance with which the transmission loss is proportional to the inverse second power of the bending radius. That is to say, the smaller the bending radius the greater the transmission loss and thus the more light is emitted from the side of the fibers. The specification points out that the bending radius of an optical fiber twisted around a central member is given by the equation $$R=(P^2: 4P^2r)+r,$$

where R is the bending radius, P the twisting pitch, r is equal to r1+r2, where r1 is the radius of the central tension member and r2 is the radius of the optical fiber.

The specification recognizes that when the twisting pitch is made longer, the bending radius is made larger and the light to be leaked from the side of the cable is decreased; whereas, when making the twisting pitch smaller, the bending radius is made smaller and the light leaking from the cable is increased. The Japanese specification teaches that by utilizing the above relationship the quantity of light to be leaked from the side of the cable can be controlled by changing the twisting pitch at the time of twisting the optical fiber around the central member.

In a second Japanese specification originating from the same applicants with the publication number HEI 2-108008, which was also published on Apr. 19th, 1990, the amount of light lost from the side of the optical fibers is varied by varying the outside diameter of the central member, which also has the effect of varying the bending radius of the optical fibers and allowing the light loss to be intentionally varied in this manner.

It is indeed a problem with side illuminating optical structures of this kind that with a light source at one end of the cable, the amount of light lost from the side of the cable progressively drops off as the light propagates along the length of the cable. One way of counteracting this effect is to feed in light from both ends of the cable, which may be done by using a second light source or by converting the cable into a loop and illuminating both ends from the same light source. However, even with this approach, the intensity of the light leaking from the cable is not entirely uniform along the length thereof.

In addition to trying to obtain a relatively uniform intensity of illumination along the length of the optical structure, which is desired for many purposes, applications can be envisaged where the light loss is desired over only a certain proportion of the length of the optical structure. For example, if the light source has to be positioned remote from an area to be lit by the side illuminating optical structure, then it is preferable if no light is lost from the side of the optical structure until the light from the source reaches the area to be illuminated, so that the maximum amount of light can be lost in the area to be illuminated.

The two Japanese specifications referred to above show one way in which this could be achieved. However, these two approaches make it necessary to specifically build each optical structure for each application or to use special core members having larger and smaller diameter portions.

The concepts outlined in the two Japanese specifications are also reflected to some extent in U.S. Pat. No. 5,345,531 of Fiberstars Inc. and in U.S. Pat. No. 5,333,228 of Super Vision International Inc.

Thus U.S. Pat. No. 5,333,228 of Supervision International Inc. relates to a lateral illumination fiber optical cable device comprising: a central core including a longitudinally extending tube having an axially extending light reflective outer surface; a plurality of optical fibers uniformly distributed circumferentially about the core and extending axially along the reflective surface; and a transparent tubular sheath running longitudinally, coaxially of the core about the optical fibers. The optical fibers uniformly distributed circumferentially about the core may be in the form of bundles, which are either laid straight or helically wound about the core.

The specification suggests that commercially available bundles of helically twisted fibers should be cabled, wrapped or wound around a white or silver-reflective plastic tube forming the central core. Clearly some form of twisting is necessary to achieve adequate light loss from the optical structure, and indeed the commercial product sold by Super Vision involves cabled bundles and also bundles being helically twisted about the common core.

Thus the structure proposed by Super Vision may be likened to a plurality of cables made in accordance with the Japanese patent publication HEI 2-108007, which are in turn twisted around a common core, such as is basically proposed in U.S. Pat. No. 4,885,663.

U.S. Pat. No. 5,345,531 relates, amongst other things, to optical lighting apparatus comprising: a set of a plurality of optical fibers, each fiber including a core of the material that is transparent to radiation in a selected waveband and including a layer of cladding materials surrounding the core; said set of a plurality of optical fibers being wound in contiguous relationship substantially as a spiral along the length thereof to form a cable and being adapted to receive light flux at at least one end thereof for laterally emitting light flux received thereby substantially along the length thereof from said end; a sheath of light transmissive material disposed about the cable to retain the set of optical fibers in the contiguous relationship; and an outer layer of light transmissive material disposed to enclose the cable and sheath over the length thereof. This apparatus is thus very similar to the cable disclosed in the Japanese patent publication HEI 2-108007, but has the additional feature of a sheath of light transmissive material disposed about the cable to retain said optical fibers in a touching relationship.

OBJECT OF THE PRESENT INVENTION

The object of the present invention is to provide a side illuminating optical structure which makes it possible to obtain a higher light output for a given number of optical fibers than has hitherto being possible and to satisfy this object without a substantial increase in cost and complexity.

It is a further object of the present invention to make it possible to obtain a more uniform light output along the length of a side illuminating optical structure, or a desired light intensity profile along a side illuminating optical structure without substantial complication of the manufacturing process. It is a yet further object of the present invention to make it possible to obtain the desired light output only in desired portions of a side illuminating optical structure and to make it easier for the customers of the products to tailor the side illuminating optical structure to their own particular requirements.

BRIEF DESCRIPTION OF THE INVENTION

In order to satisfy these objects there is provided, in accordance with the present invention, a side illuminating optical structure of the initially named kind which is characterized in that means is provided for ensuring a permanent compressive stress in the optical structure, for example a permanent compressive stress in the radial direction and/or in the axial direction. It has namely been found that the light output from a side illuminating optical structure comprising a plurality of elongate optical fibers of the initially named kind may be substantially increased by constructing the structure in such a way that the optical fibers have a permanent compressive stress in the optical structure.

Thus, whereas the prior art cables are all relatively loose structures from which it is apparent that the individual optical fibers do not have any significant permanent compressive or tensile stresses, the present invention proposes optical structures in which the individual optical fibers do have a significant level of permanent compressive stress, for example in the radial direction and/or in the axial direction, which enhances the light output from them.

The invention proposes various ways of achieving such permanent compressive stresses.

Thus, one possibility is to wind at least one transparent tape with tension helically around the optical cable. The amount of light lost from the cable can be controlled via the tension in the transparent tape. Since the winding of the transparent tape can be done on a length of finished cable, it is possible to enhance the light output from particular regions of the cable by increasing the tension in the tape there.

Another possibility for introducing the permanent compressive stress into the optical cable is to surround the cable with an elongate transparent sleeve designed to compress the cable. This can be achieved, on the one hand, by an elastic sleeve which is stretched during its application over the optical cable and thereafter compresses the cable radially, or by making the transparent sleeve of a heat shrinkable material which can be heat shrunk in desired regions to enhance the light loss within those regions. An alternative means for ensuring the permanent compressive stress in the optical structure is to apply a plurality of preferably transparent rings over the structure, with the rings being preferably placed spaced apart at intervals over the outside of the optical cable. The use of transparent rings ensures that light can also be lost from the optical cable at the location of the transparent rings. The rings may be uniformly spaced apart or non-uniformly spaced apart. More particularly, they may be spaced at progressively changing intervals along the optical cable over a repeat length thereof. By varying the spacing of the rings along the cable the compressive stress distribution along the cable can be varied and this assists in achieving, for example, a desired constant light intensity from the cable.

The ability to vary the spacing of the rings over a repeat length of the cable makes it possible to sell the cable as a whole to a particular user, who then cuts off each successive repeat length to use for his intended purpose.

Another possibility of achieving a permanent compressive stress along the length of the optical cable is to wind one or more elongate structures, such as fibers, filaments, yarns or tapes helically around the optical cable. It is particularly preferred if two optical fibers are helically wound around the optical cable in opposite directions, for example in the manner disclosed in European patent 291 023, which relates to a core for a cable rather than to a side illuminating optical structure. The pitch of the helically wound elongate structures may be constant along the length of the optical cable or may be varied from the first value to a second value over a predetermined repeat length of the optical cable. In the first case the average compressive stress along the cable may be kept constant; in the second case it can be progressively increased or decreased over the predetermined repeat length of the optical cable. Although it is possible to use other materials, such as endless glass fiber bundles or cables, for the elongate structures that are helically wound around the optical cable, it is particularly preferred if the or each helically wound elongate structure itself comprises a plastic optical fiber, since these fibers then also participate in the light loss from the cable.

In addition to such helically wound structures a braid may be woven around the optical cable, with the elongate structures used to form the braid being tensioned during the braiding process so as to impart a permanent compressive stress to the optical cable. Although the braid can be made of optically transparent materials, and can indeed also be made as a braid with open meshes between the crossing elements of the braid, so that light can readily be transmitted through these meshes, it is particularly preferable if the braid is formed of optical fibers, in particular plastic optical fibers. These optical fibers are also sufficiently bent during the braiding process for them to emit substantial quantities of light.

Indeed, it is possible for the braid to be the only active part of the side illuminating optical structure, i.e. only the braid is made of optical fibers and the core is simply a former around which the braid is made. It need have no particular optical properties although it is preferably made reflective so that light emitted inwardly by the optical fibers of the braid is reflected outwardly again and not unnecessarily attenuated by the core.

When forming a braid around an optical cable it is also possible to weave the braid with progressively varying tension along the cable over a predetermined repeat length thereof, and thus to tailor the light loss properties from the cable in a desired manner over the said repeat length.

In all these embodiments a plastic sleeve is preferably provided over the outside of the optical cable or braid, with or without pre-stress so that the outside of the side illuminating optical structure is a continuous smooth surface and is thus not so likely to become dirty and is also easier to clean.

Another way of obtaining permanent compressive stress in a side illuminating optical structure formed as an optical cable is to produce the permanent compressive stress by controlling the tensions applied to the optical fibers during cabling.

Thus, for example, the common core of a cable may be subjected to substantial axial tension during cabling so that, once cabling has been terminated, the core tends to shrink in length and produces additional tension in the outer cables or strands of the final product. Equally, the tension of each optical fiber in a strand, during cabling of the fibers to form a strand, and the tension in each individual strand during the cabling of a plurality of strands to form a cable, may be controlled in such a way as to achieve a permanent compressive stress in the cable.

Particularly preferred embodiments of the present invention are set forth in the appended claims.

BRIEF LISTING OF THE FIGURES

The invention will now be described in more detail by way of example only and with reference to the accompanying drawings in which are shown:

FIG. 1 a schematic diagram illustrating one way of making a cable from a plurality of optical fibers or strands, FIG. 2 a schematic cross-section through a strand comprising seven optical fibers which have been cabled together to form the strand, FIG. 3 an optical cable formed by cabling together seven strands as shown in FIG. 2, FIG. 4 a cross-section through a strand comprising ten optical fibers which have been cabled together around a core comprising four identical optical fibers as shown in FIG. 5, FIG. 5 a cross-section through the four optical fibers forming the core of the strand of FIG. 4, FIG. 6 a cross-section through an optical cable formed by cabling ten strands in accordance with FIG. 4 around a rope core, FIG. 7 a cross-section through an optical cable formed by cabling together three strands in accordance with FIG. 4, FIG. 8 a cross-section through a cable comprising essentially the ten cable strands of FIG. 6 cabled together around a core consisting of the three cable strands of FIG. 7, FIG. 9 a schematic cross-section through another cable formed by cabling together seven strands in accordance with FIG. 4, FIG. 10 a schematic cross-section through an optical cable formed by cabling together six strands in accordance with FIG. 4 around a single strand in accordance with FIG. 4, with the single strand of FIG. 4 having previously been covered with its own extruded covering, FIG. 11 a schematic cross-section through a cable formed by cabling together seven strands in accordance with FIG. 4, each of which has, however, previously been provided with its own extruded cover, FIG. 12 the strand of FIG. 4 wound with a tape, FIG. 13 the strand of FIG. 4 showing an alternative form of tape winding, FIG. 14 the strand of FIG. 4 showing a yet further alternative form of tape winding, FIG. 15 a schematic illustration of a tape wound strand similar to the tape wound strand of any one of FIGS. 12, 13, or 14, and additionally provided with an extruded sleeve, FIG. 16 the strand of FIG. 4 provided with an outer sleeve, FIG. 17 the strand of FIG. 16 provided with an outer sleeve, FIG. 18 the strand of FIG. 4 provided with rings to achieve a permanent compressive stress therein, FIG. 19 the strand of FIG. 4 provided with rings to achieve a permanent compressive stress therein similar to FIG. 18 but with a continuously varying pitch of the rings, FIG. 20 the strand of FIG. 4 provided with a helically wound elongate structure, FIG. 21 the strand of FIG. 4 provided with two cross wound, helical, elongate structures, FIG. 22 the strand of FIG. 4 provided with a helically wound structure similar to FIG. 20 but with varying winding pitch, FIG. 23 the strand of FIG. 20 but provided with an outer sleeve, FIG. 24 the strand of FIG. 4 provided with an outer braid, FIG. 25 a diagram showing the method of forming the braid of FIG. 24, FIG. 26 an alternative side illuminating optical structure utilizing a braid.

DESCRIPTION OF PREFERRED EMBODIMENTS

Figure 2:
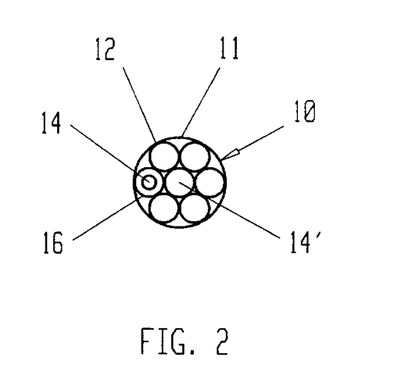

Referring firstly to FIG. 2, there can be seen a cross-section through a side illuminating optical structure comprising seven optical fibers 12 which are twisted together to form a strand. The optical fibers 12 are known per se, and each has a core 14 of a first plastic material having a first refractive index and a cladding 16 of a second plastic material having a second refractive index lower than the refractive index of the core 14. Fibers of this kind, generally with a core of PMMA and a cladding of a fluorinated polymer are readily commercially available, for example from the companies Mitsubishi Rayon Company Ltd. under the designation "ESKA" or from the Japanese companies Ashari Chemical and Torray Industries Inc.

Figure 1:
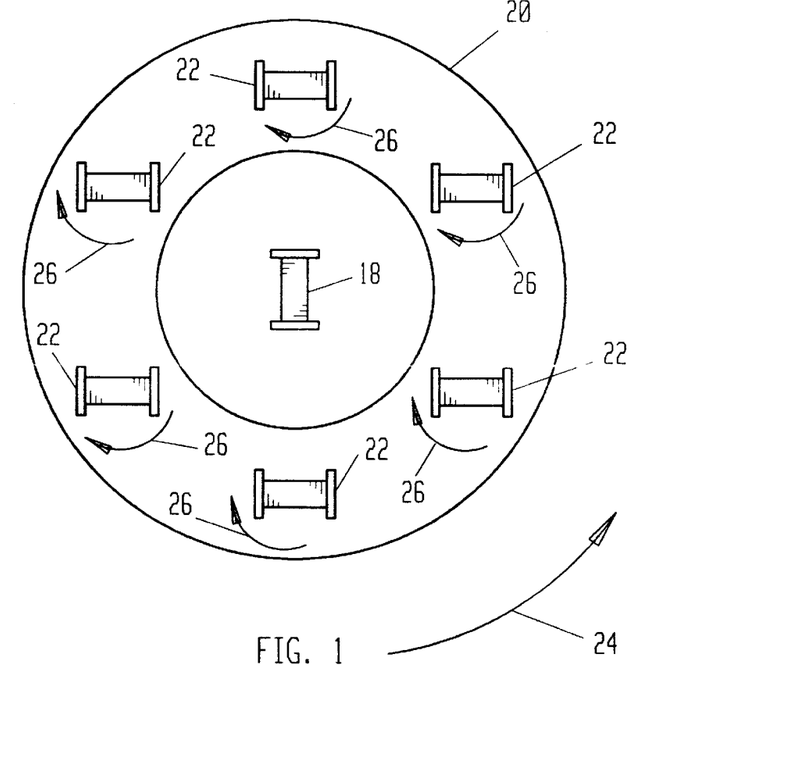

More specifically, the strand of FIG. 2 comprises a single straight optical fiber 14' around which six further fibers 14 of the same design are laid in a helical arrangement. This is achieved using an arrangement as shown in FIG. 1, in which there is a single fixed spool 18 supplying the center fiber 14', with the fiber simply being unraveled from this spool. Around the fiber 14' coming from the single spool there is a carrier 20 carrying six separate spools 22, each supplying one of the outer fibers 14 of the strand. In forming the strand, the carrier is rotated in one direction shown by the arrow 24 around the central fiber, and each spool 22 is rotated in the opposite direction (arrow 26) on the carrier 20. This makes it possible to lay the fibers in the strand without tension, which results in a strand (itself a form of cable) which does not try and twist or untwist in the free state.

It will be noted that although in this embodiment the carrier is shown rotating in the direction of the arrow 24 (S-twist), it is also possible for the carrier to rotate in the opposite direction, in which case the directions of rotation of the spools will also be reversed.

Moreover, it will be appreciated by those skilled in cable making that the design schematically illustrated in FIG. 1 is just one way of making cables or ropes. There are a variety of different ways which are all known per se and which can be used for the purposes of the present invention. The important feature is to ensure that the various guides present to guide the individual optical fibers are able to do so in a manner which is considerate to the fibers and which does not subject them to mechanical damage. Optical fibers which have been mechanically damaged lose light at higher intensity through the damaged portions and, for example, frequently show streakiness at the surface due to mechanical damage, which is considered undesirable.

Figure 3:
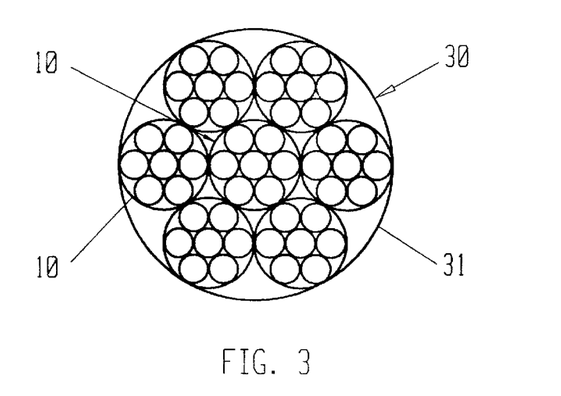

The strand 10, which is itself a side illuminating optical structure, would normally be made into a cable, and a structure for a cable 30 which has been made using the strands of FIG. 2 is shown in FIG. 3. It will be noted that there is a central straight strand 10' which is surrounded by six further strands 10, which have been cabled together.

The cabling of the strands 10, 10' to form the optical cable 30 takes place essentially with the same apparatus as shown in FIG. 1, i.e. the central strand 10' is a straight strand, around which there are then cabled the six further outer strands 10, so that in this case the spool 18 supplies the central strand 10' and the spools 22 supply the outer strands 10. It is also possible to rotate the spool for the central fiber or strand.

For the specific design shown in FIGS. 2 and 3 the optical fiber would typically be a 0.75 mm OD fiber, seven of which are twisted together to form the strand 10, 10' with a strand pitch of 70 mm, and with the strands 10, 10' being twisted together to form the cable with a cable pitch of 110 mm.

It is possible to form the optical cable shown in FIG. 3 with an S-twist of the central strand 10' and of the outer strands 10, but with a Z-twist of the strands 10 when cabled around the central strand 10'.

It is also possible to use Z-twisted strands and to then use S-twists for the cabling of the strands 10 around the central strand 10'.

Moreover, it is also possible to use S-twists for the central strand 10' and also S-twists for the cabling of the S-twisted strands 10 around the central strand 10'. Moreover, it is also possible to make the strands 10 and 10' with Z-twist and to cable the outer strands 10 with Z-twist around the central strand 10'. Different pitches (or lay lengths) will generally be selected for the twisting of the fibers to form strands (strand pitch) and for the twisting of the strands to form a cable (cable pitch).

It will be noted that the circles 11 and 31 shown in FIGS. 2 and 3 simply represent an envelope curve for the strand and cable respectively. That is to say, the generally triangular spaces between adjacent fibers of the strands and between adjacent strands of the cable are not normally filled with material but are rather open interstices.

Figure 4:
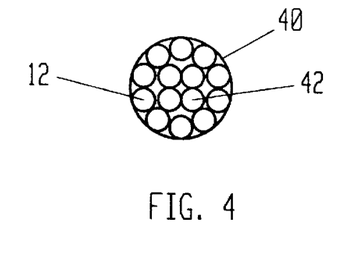
Figure 5:
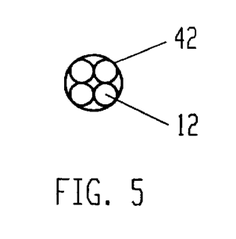

FIG. 4 shows an alternative design of strands 14 which comprises 14 optical fibers, namely a central core 42 of four optical fibers 12 shown in cross-section in FIG. 5, with ten outer optical fibers twisted around the straight core 42. Again, the circles surrounding the strand 40 of FIG. 4 and the core 42 of FIG. 5 are simply to be thought of as an envelope curve. In this example the fiber is again of 0.75 mm diameter and has a strand pitch of 60 mm.

Figure 6:
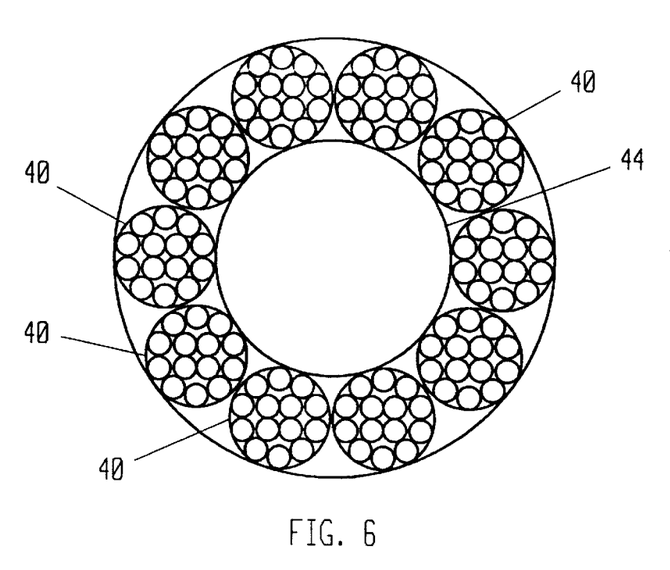

The strand 40 of FIG. 4 is itself a side illuminating optical structure, but will ordinarily be formed into a larger diameter cable for practical use. Such a cable is shown in FIG. 6 and comprises, in this example, a rope core 44 of 7.43 mm diameter, with ten strands 40 cabled around it. The cable pitch is 125 mm.

The strand of FIG. 4 is built using a device similar to FIG. 1, but in this case with one center spool 18 for the four fiber cores 42, or four separate spools one for each core fiber, and ten spools 22 for the ten outer fibers 12.

When forming the cable of FIG. 6, the rope is supplied by the center spool 18 and ten spools 22 are used to supply the outer strands 40.

Figure 7:
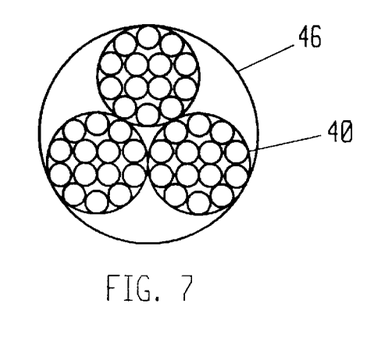
Figures 8, 9, 10, 11:
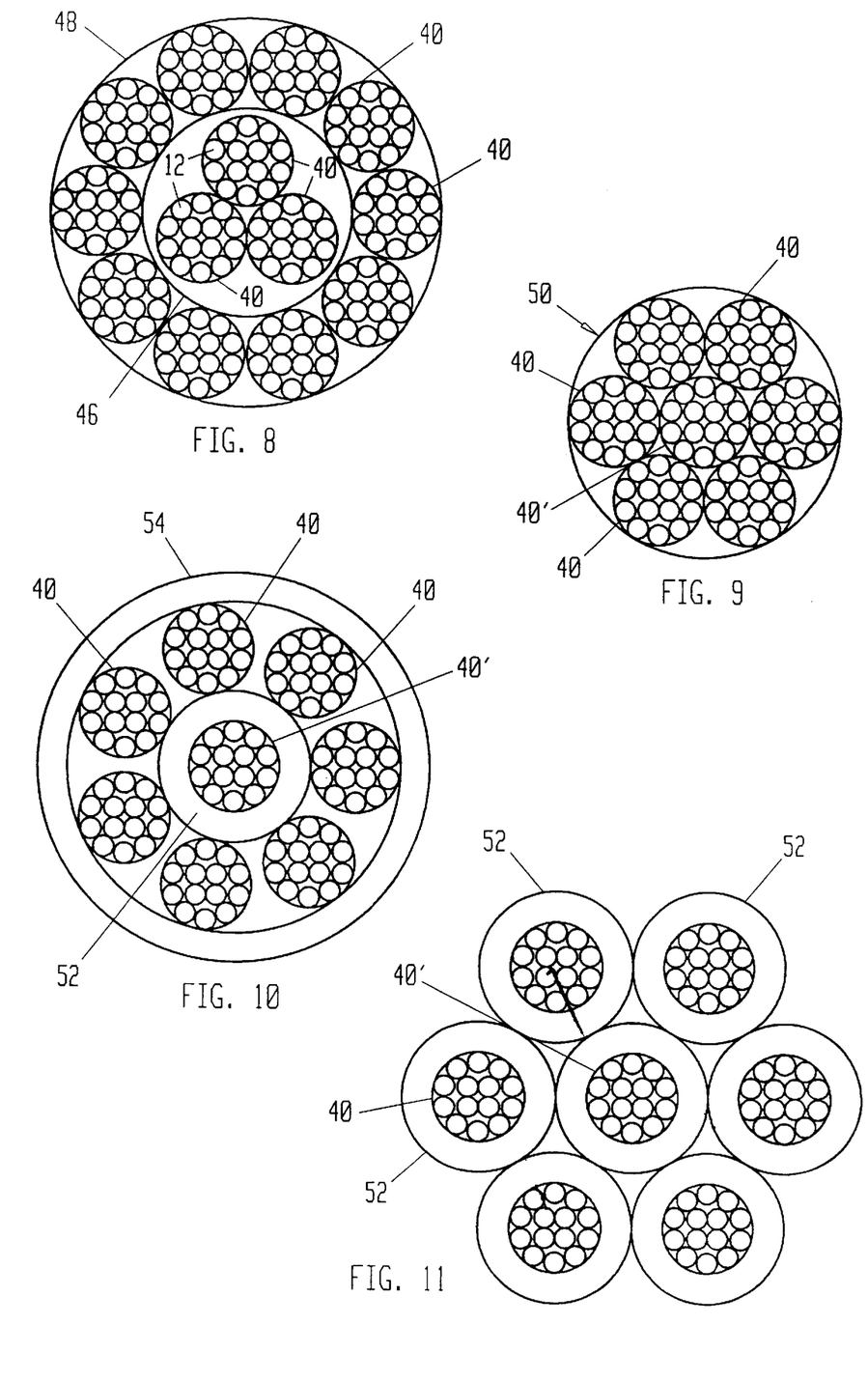

It is also possible to cable three strands 40 together to form an optical cable, and a cross-section through a cable of this kind is shown in FIG. 7. In this case there are just three spools 22 present on the cabling apparatus, and there is no central core member. The outer circle is again simply an envelope curve like the circle 11 in FIG. 2 as. The optical structure 46 shown in FIG. 7 can also be used as the core for an optical cable in accordance with FIG. 6, i.e. in place of the rope 44. A cross-section through a cable of this kind is shown in FIG. 8. It should also be remarked that it is possible to form the central core 46 of the cable of FIG. 8 without twist. That is to say, the three strands 40 forming the core of the cable simply extend parallel to one another without twist, although the optical fibers 12 of the individual strands 40 are cabled around the respective cores 42.

FIG. 9 shows a cross-section through a cable 50 similar to that of FIG. 3 but with each of the seven strands, i.e. one center strand 40' and six outer strands 40, being formed in accordance with FIG. 4. Here the fibers are typically of 0.75 mm diameter and the strand pitch is 70 mm, whereas the cable pitch is 110 mm.

FIG. 10 shows a not dissimilar design to that of FIG. 9. However, the central strand 40' is provided here with an extruded cover 52 which is preferably transparent or translucent, but could be reflective. Moreover, the outer strands 40 are surrounded by an outer extruded cover 44, which is transparent or at least translucent.

Finally, FIG. 11 shows a design which again resembles that of FIG. 9, but in this case each of the strands 40' and 40 are provided with a respective extruded cover 52.

The cable designs of FIGS. 2 to 11 have been described to show certain basic strand and cable constructions which can be used for the purpose of the present invention. They should not be considered restrictive and a whole variety of different designs is possible.

In the following, examples will now be given of different ways of achieving a permanent compressive stress in the optical fibers of the strands and cables of FIGS. 2 to 11. In each case the optical cable shown is illustrated as the cable of FIG. 4 as seen in side view, but is given here the general reference numeral 60. This is intended to indicate that the optical cable 60 shown in the various drawings can be of any cable constructions, for example, without restriction any cable construction in accordance with FIGS. 2 to 11.

Figures 12, 13:
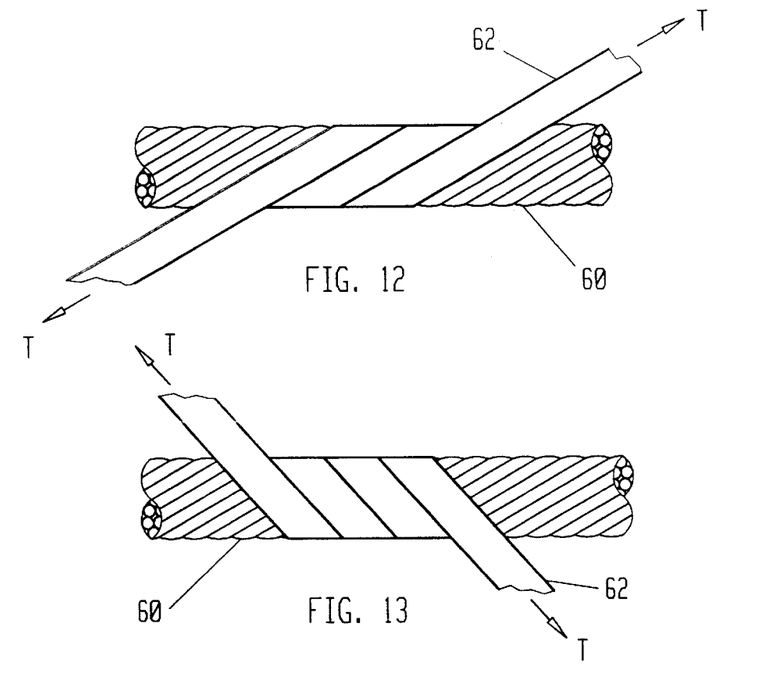

Turning now to FIG. 12, the reference numeral 62 designates a transparent tape which is wound with tension helically around the optical cable 60. In this example, the tape is wound without overlap but with adjacent turns touching and, as can be seen from FIG. 12, the pitch of the outer tape 62 is selected to be the same as the pitch of the optical cable 60. This is, however, not necessary. Other pitches can be selected, i.e. longer or shorter ones, and indeed the pitch could also be in the opposite direction as shown in FIG. 13.

As a result of the permanent tension in the tape 62 there is a permanent compressive stress in the fibers 12 of the cable 60.

It will be noted that the tape 62 in FIG. 13 has been given the same reference numeral as in FIG. 12 and indeed throughout the specification the same reference numerals will be used to designate common parts or parts having the same function so that the descriptions given in respect of particularly numbered components will also apply to components of the same number, even if the description is not repeated.

Figure 14:
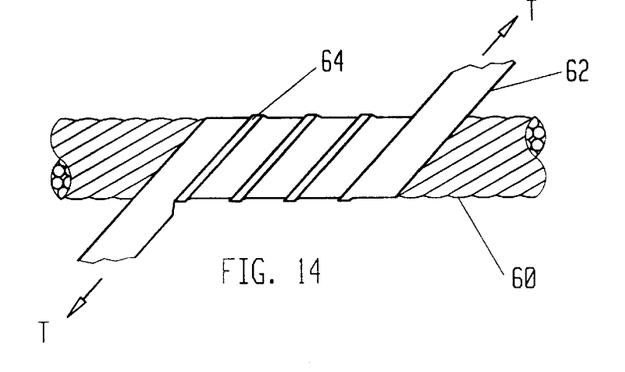
Figure 15:
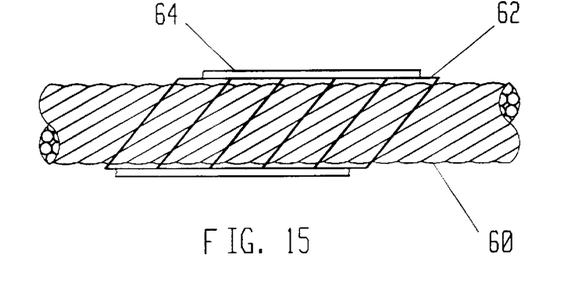

FIG. 14 shows that it is possible to effect the tape winding with overlap 64. FIG. 15 again shows a cable 60 around which there is wound a transparent tape 62, in this case without overlap and with a tape pitch less than the cable pitch but with the wrapping of the tape taking place in the same direction as the twist in the cable. The important point to note about FIG. 15 is the presence of a transparent outer jacket 64 which surrounds the helically wound tape 62. An outer transparent jacket 64 of this kind can be provided in the embodiments of the other FIGS. 12 to 14, and will indeed normally be provided so as to ensure a continuous smooth outer surface which is not liable to trap dust or dirt and which is easy to clean. It could however also be omitted, e.g. if the cable is placed behind a sheet of glass in an advertisement panel.

In all these embodiments the compressive pre-stress in the optical cable 60 is achieved by winding the tape member under tension T.

It should be noted that it is possible to vary the tension T cyclically during the winding of the tape member 62. This means it is possible to vary the compressive stress along the cable within a repeat length of the cable. By varying the compressive stress it is possible to ensure, for example, uniform light output over the length of the cable. To achieve this the tension in the tape and thus the compression in the optical cable would typically be less at the end of the cable adjacent the light source, and the tension and thus the compressive stress would increase along the cable in the direction away from the light source.

If adequate friction is provided between the tape 62 and the optical cable 60, and/or between adjacent turns of the tape 62 when the latter is wound with overlap, then it is possible to avoid the tape shifting after winding, which would tend to counteract the desired effect.

This technique can also be adapted to enhance light output from the portion of a cable where high illumination is intended. For example, if the cable is used to form an illuminated outline around a display from a light source positioned remote from the display, then the tape 62 can be wound without tension in the leader portion of the optical cable passing from the light source to the display, and can then be wound with substantial tension in the area of the cable passing around the display. If the cable is illuminated from both ends, then the return portion from the display to the light source could again be wound with lower tension.

It should be noted that the tape winding of the structure may well not be done by the manufacturer of the cable, but rather by the user of the cable who thus has the possibility of tailoring the optical cable 60 to his specific needs. Thus the cable manufacturer can make a uniform optical cable 60, and the tailoring of the light output characteristics of the optical cable can be effected by the end user in the manner in which he carries out the tape winding.

Figure 16:
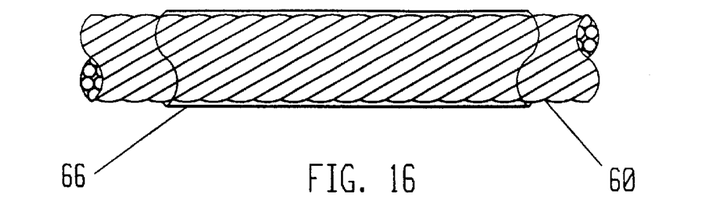

FIG. 16 shows an alternative way of varying the compressive stress along an optical cable 60. In this case a sleeve of transparent heat shrinkable material 66, such as polyethylene, is placed around the optical cable 60 at the time of manufacture, or optionally later by the user of the optical cable.

In regions where higher light output is desired, the sleeve 66 can then be heated to cause it to shrink in these regions and in this way to produce the desired compressive stress in the cable. By controlling the temperature and/or duration of heating of the shrinkable material it is also possible to vary the compressive stress along the length of the cable 60. With the example of the illuminated outline of a display given earlier in this application it is also possible not to shrink the outer sleeve 66 in the leader and return regions of the cable but only in the region of the cable used to form the illuminated outline of the display.

Figure 17:
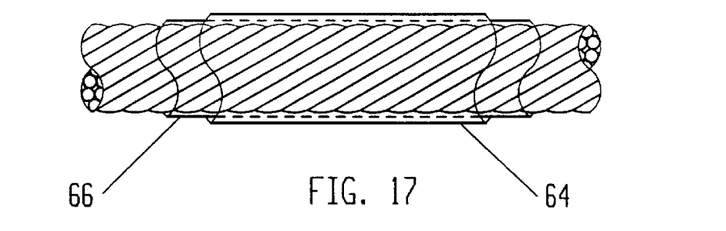

FIG. 17 shows that the heat shrinkable sleeve 66 of FIG. 16 can also be surrounded by a sleeve 64 of a material having good cleaning and transparency properties.

Figure 18:
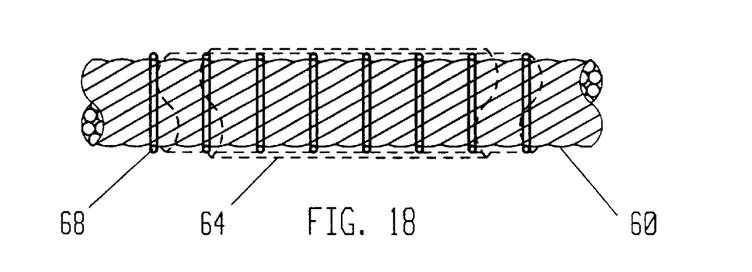

FIG. 18 shows an alternative embodiment in which the compressive stress in the optical cable 60 is produced by a plurality of spaced apart rings 68 arranged at uniform intervals along the cable. These rings are preferably of a transparent material, but can also be of a non-transparent material if their axial dimension is smaller in comparison to the spacing between them. These rings 68 are permanently under tension, for example by dilating them as they are passed over the cable and then allowing them to contract around the cable, so as to achieve the desired compressive stress. The reference numeral 64 in FIG. 18 shows a sleeve in broken lines, which will optionally be provided around the cable 60 after the rings 68 have been fitted. The rings can be fitted either by the manufacturer of the cable or by the user.

Figure 19:
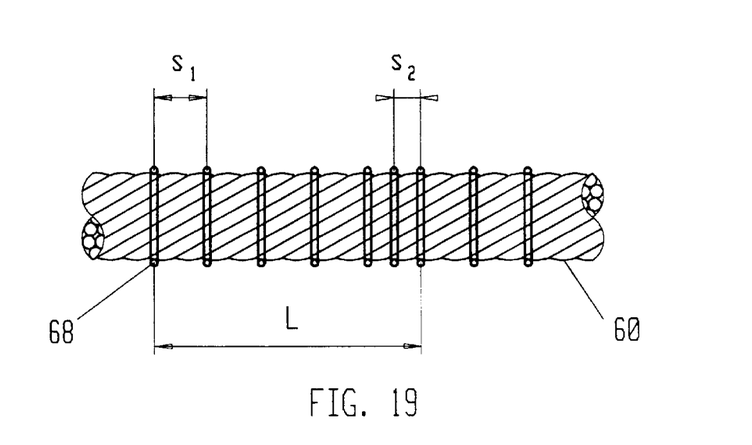

FIG. 19 shows that it is also possible to vary the spacing between neighboring rings 68 so as to vary the compressive stress in the optical cable 60 over a repeat length L. That is to say, the spacing S1 of the rings decreases from a larger value to a smaller value S2 over the repeat length and then either from the larger value S1 again or progressively increases over the next repeat length of the cable.

Figure 20:
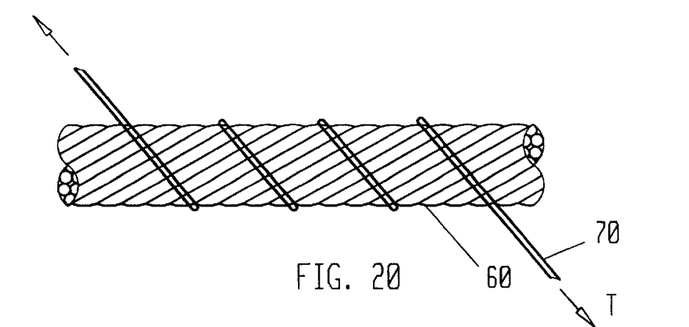

FIG. 20 shows that it is possible to achieve the desired compressive stress in the optical cable 60 by winding an elongate structure 70 helically around the optical cable 60, with tension T being applied to the elongate structure 70 during this winding process. The elongate structure can be formed by elongate fibers, by elongate filaments, by yarns or indeed by narrow tapes. The elongate structures are preferably optically transparent, or translucent. However, this is not essential if they are of small diameter or narrow width in relation to the pitch between the turns of the elongate structure 70 along the cable.

One preferred elongate structure is an endless glass fiber bundle or cable. Such structures have the advantage of extremely high strength for very small cross-sections and also the advantage that the tension applied during winding can be maintained over a long period of time.

Another possibility which is preferred is to use an optical fiber itself for the helical winding of the structure. The optical fiber then not only contributes to the compressive stress in the optical cable 60 but itself also acts as a light source.

Figure 21:
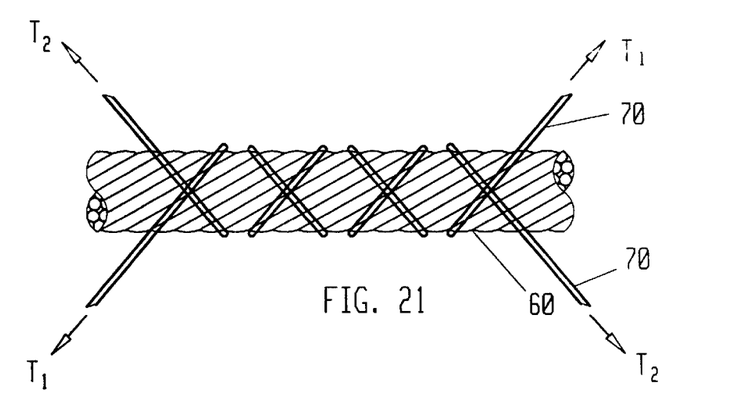

Whereas FIG. 20 shows a simple helical twist of an elongate structure 70 around the cable 60, FIG. 21 shows a preferred design in which two elongate structures 70 are cross-wound under tension around the optical cable 60. This cross-winding can take place in the manner disclosed in the European patent 291 023. The use of the suffixes T1 and T2 in FIG. 21 indicates that the tension under which the two elongate structures 70 are wound need not necessarily be the same.

Figure 22:
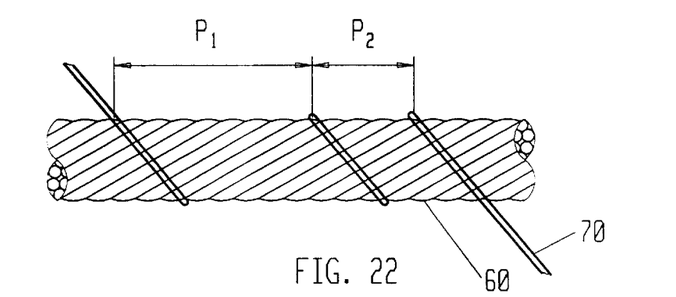

FIG. 22 shows an optical cable 60 with the helical winding 70 which is effected in similar manner to the helical winding 70 in FIG. 20, but this time with a continuously changing pitch of the elongate structure 70 being used for the helical winding. It will be noted that in FIG. 22 the pitch P2 of the second turn is less than the pitch P1 of the turn preceding it. In this way it is possible to continuously change the pitch P over a repeat length of the optical cable 60. Clearly this is done for the reasons given above in connection with the differentially spaced rings 68 and the use of changing tension in the tape wrapping member 62.

Figure 23:
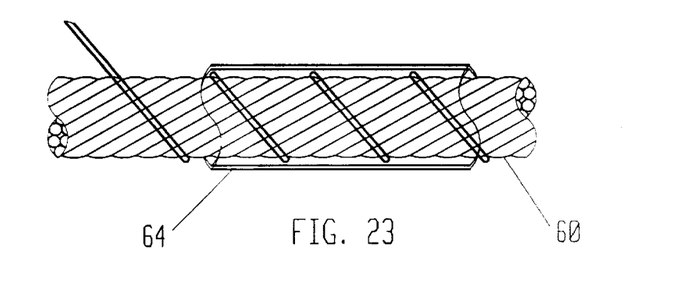

FIG. 23 shows that an elongate sleeve of transparent material 64 would normally be applied over the helically wound optical cable 60 in order to provide a closed surface which is easy to clean and does not tend to trap dust or dirt or such up moisture by capillary action.

Figure 24:
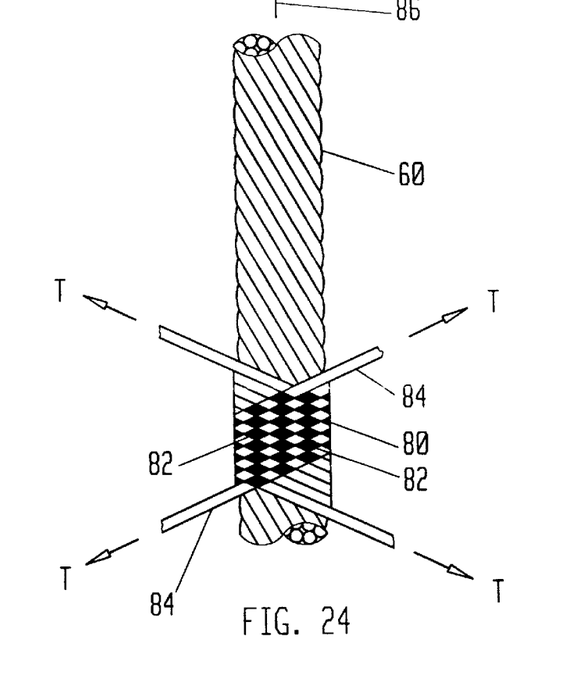

FIG. 24 shows an alternative way of achieving compressive stress in the optical cable 60. In this case a transparent braid 80 is built up around the optical cable 60. The black diamonds 82 indicate knuckles of the elongate structures 84 used to produce the braid 80, i.e. at positions where one elongate structure 84 overlies the lower lying structure.

Figure 25:
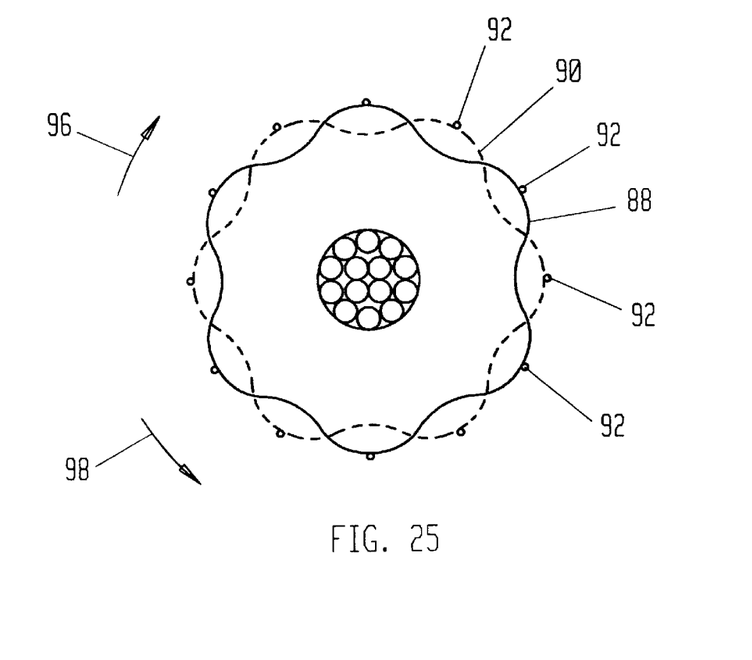

The manner in which the structure of FIG. 24 is produced is illustrated in FIGS. 24 and 25. The arrow 86 in FIG. 24 indicates that the optical cable 60 is continuously moved in the upward direction from, for example, a spool bearing a substantial length of the optical cable 60. The two wave-shaped tracks 88 and 90 shown in FIG. 25 by a solid line and by a broken line illustrated the paths taken by spools 92 bearing the elongate structures 84 used to form the braid. That is to say the spools 92 on the solid line track move in one direction of rotation (arrow 96) around the optical cable 60, whereas the spools 92 on the broken line track move in the opposite direction 98 around the optical cable 60. The repeated cross-overs of the tracks 90 and 88 lead to the weave pattern in the braid 80.

The formation of the braid in this way is well known per se. It is possible to modify the braiding process so that the braiding takes place with a not inconsiderable tension T in the elongate structures 84. As a result, the braid places a compressive stress on the elongate cable 60. It is also possible to vary the tension used to form the braid over a repeat length of the optical cable 60.

Figure 26:
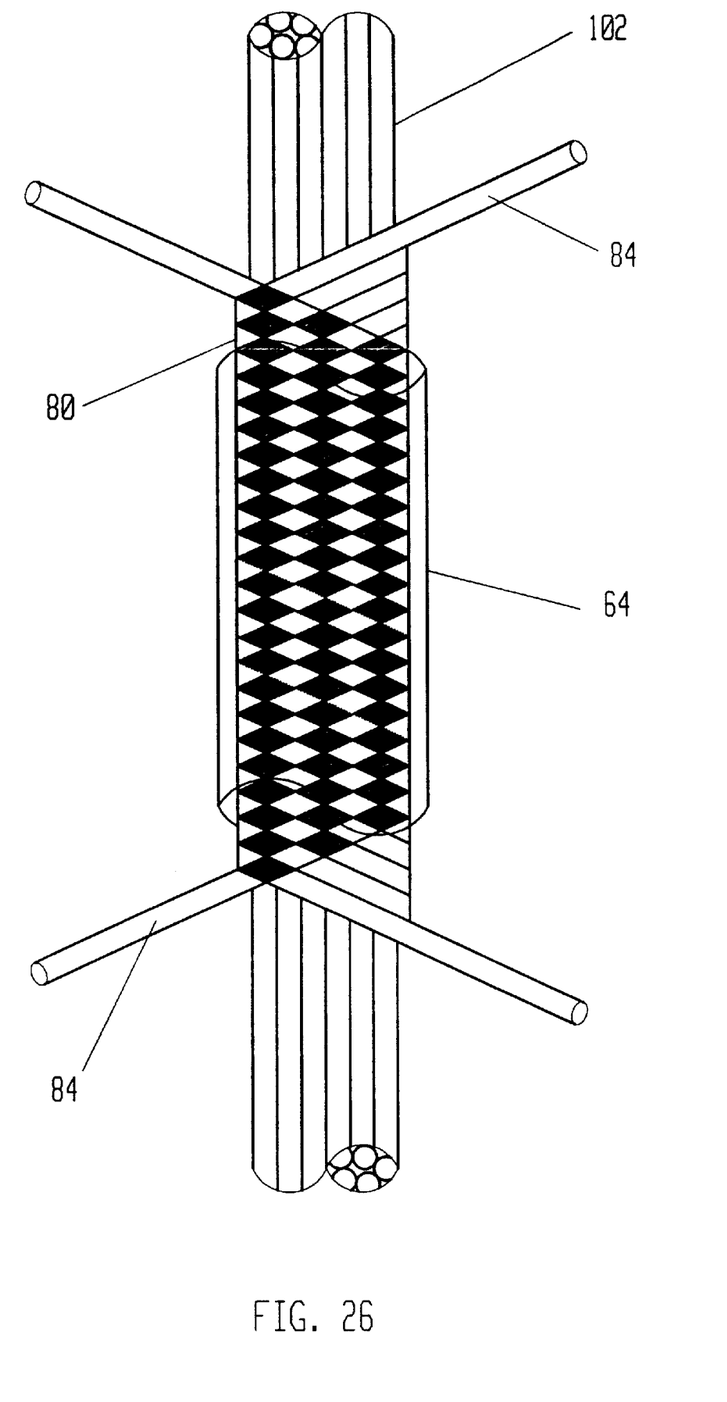

Because the finished braid 80 has to be transparent to light, or at least translucent, the materials for the elongate structures 84 should be chosen accordingly. One possibility is to form the braid using optical fibers for the elongate structures 84, and in this case the bending of the optical fibers at the knuckles of the braid enhances the light propagation from the braid. Indeed, this effect can be maximized to such an extent that there is no need to form the core as an optical cable. Instead, it can simply be a reflective rope tube or other structure, for example a bundle of parallel tubes (or optical fibers), as shown in FIG. 26.

If the braid is used as the light emitting part of the structure, then it is possible to form the braid while the core 102 is subjected to tension. When the manufacture of the braid is completed, the tension in the core 101 causes the core to shrink and produces a compressive stress in the optical filaments forming the braid, thus enhancing the light output therefrom. Again the reference numeral 64 in FIG. 26 shows that a transparent sleeve can be placed around the braid to provide a surface which can be easily cleaned and does not trap dust etc.

It will be noted that it is possible when forming a cable, for example a cable as shown in FIGS. 2 to 11, to control the tensions applied to the optical fibers when forming the strands or to the strands when forming the optical cable by cabling the strands together in such a way that the outer optical fibers in the optical structure exhibit a compressive stress. For example, it is possible to subject the core member of the strand when forming the strand, or the core strand when forming the cable, to substantial tension so that the tension in the core member or core strand produces compression in the outer fibers or strands.

It is usual, when forming cables, to have a cable core which is twisted in one direction and to have further strands cabled around the cable core in the opposite direction. Thus, the core may have an S-twist and the cable may have a Z-twist or vice versa.

A previously preferred cable cross-section is shown in FIG. 4, with optical cables being built up from a plurality of such individual cables which are cabled together. In this structure there are four optical fibers in the core of each cable-like structure, which are surrounded by ten outer fibers.

It has subsequently been found that improved results can be obtained with an unusual design of cable, particularly when outer fibers are cabled around the core fibers with the same direction of twist as that imparted to the core fibers in forming the core. Based on this structure it is then possible to develop a series of cables using the basic cable-like structure as a building block.

This concept will now be explained in more detail with reference to the FIGS. 27 to 28.

Figure 27:
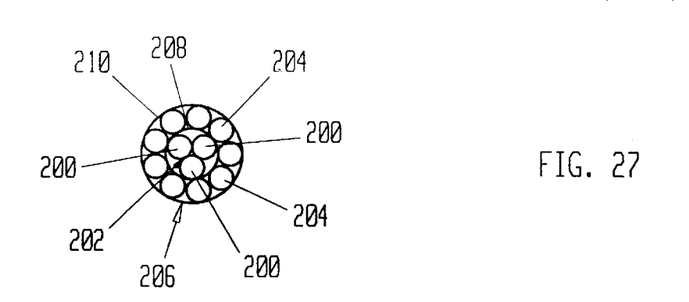
FIG. 27 is a cross-section through a preferred side illuminating optical structure.

In FIG. 27 there can be seen a basic cable-like structure comprising three optical fibers 200 which are twisted together in the S-direction to form a common core 202. The optical fibers involved have a diameter of 0.75 mm, and in the preferred embodiment the common core has a strand pitch in the S-direction of 75 mm. The strand pitch is sometimes called the length of lay. Around this common core 202 a further nine optical fibers 204 are provided, which are identical to the optical fibers 200 and which are cabled around the common core in the same direction of twist, i.e. in the S-direction, with a cable pitch (length of lay) of 40 mm. The cable-like structure 206 which results is thus an S/S-construction. It could, however, also be a Z/Z-construction. It will be noted that the circles 208 and 210 surrounding the common core and the cable-like structure respectively are not actually part of the structure. They simply define the general envelope of the common core 202 and of the cable-like structure 206.

Starting with the cable-like structure of FIG. 27, which itself is a side illuminating optical structure, it is possible to build a further side illuminating optical structure comprising one of the cable-like structures 206 as a common core 212, with a further six cable-like structures 206 cabled around the further common core 212 to form the side illuminating optical structure 214. Each of the cable-like structures 206 naturally has the same pitch as the cable of FIG. 27, i.e. 75 mm, and also the same direction of twist. The six cable-like structures 206 cabled around the further common core 212 have a cable pitch of 130 mm and the same direction of twist as the individual cable-like structures 206 including the cable-like structure 206 forming the common core 212. That is to say, the cable of FIG. 28 also has an S/S-construction. Again, if the individual, cable-like structures 206 have a Z/Z-construction, then the cable of FIG. 28 should also have a Z/Z-construction.

Figure 28:
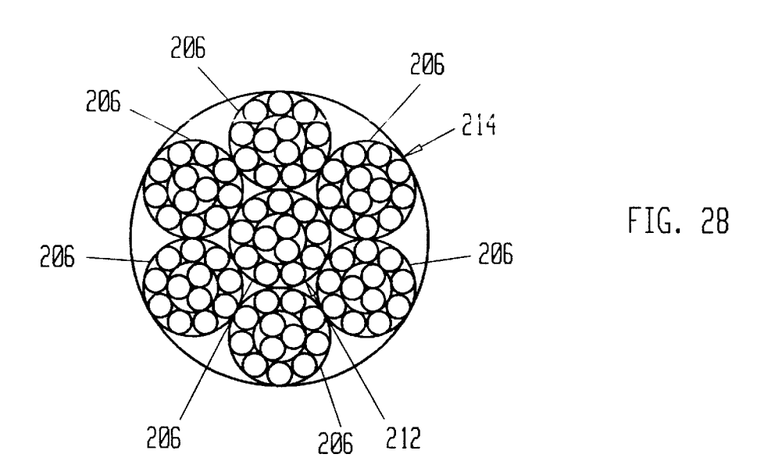
FIG. 28 is a cross-section through a further preferred side illuminating optical structure.
Figure 29:
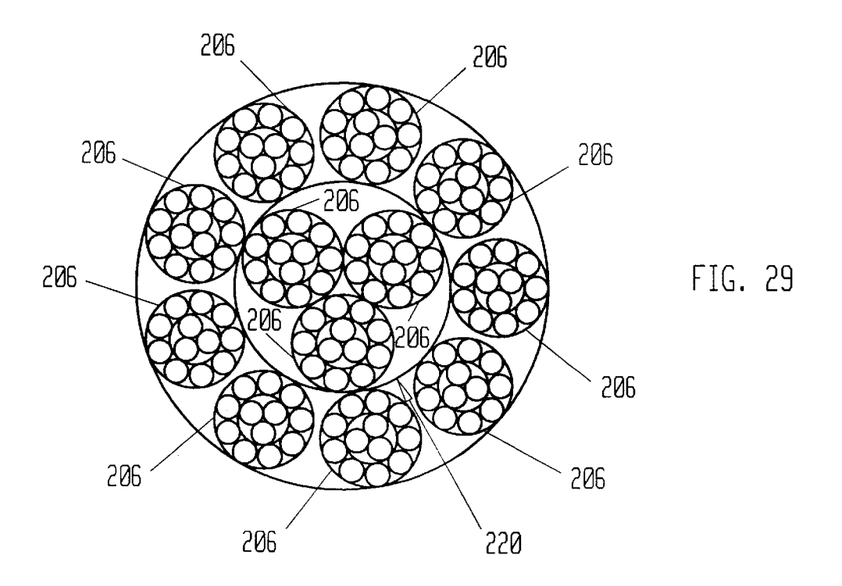
FIG. 29 is a cross-section through a yet further side illuminating optical structure.

Finally, FIG. 29 shows another side illuminating optical structure, in this case having a further common core 220 formed by twisting together three basic, cable-like structures 206 in accordance with FIG. 27. Around this further common core 220, there are disposed nine individual, cable-like structures 206, again formed in accordance with FIG. 27. The three cable-like structures forming the further common core 220 have in this embodiment a strand pitch equal to 225 mm and the nine cable-like structures 206 cabled around the further common core 220 have a cable pitch of 120 mm. Again, the nine outer cable-like structures 206 are twisted in the S-direction, the same as the direction of twist of the further common core 220, so that again the cable structure of FIG. 29 has an S/S-construction. Naturally, if the basic structures 206 were formed with a Z/Z-construction, then the composite cable of FIG. 30 would also have a Z/Z-construction. Again, in both FIGS. 28 and 29, the geometrically round circles simply define the overall envelope of the individual cable-like structures, of the further common core 212 or 220 and of the completed optical structure. They do not represent a physical element of the construction.

Although the structures of FIGS. 27 to 29 can be operated with a permanent compressive stress, they have also been found to operate successfully without such compressive stress. Moreover, they have the advantage that they can be produced without the danger of damage to the individual fibres, which would otherwise impair the light output, especially its uniformity.

I claim:

1. Side illuminating optical structure comprising a plurality of elongate optical fibers, each having a core of a first plastic material having a first refractive index and a cladding of a second plastic material having a second refractive index lower than said first refractive index, said fibers being cabled about a common core to form an optical cable, wherein said common core may be an optical fiber or a group of fibers or a cable of optical fibers or another elongate structure such as a tube, a rope or a plurality of filaments or reinforcing members, the improvement comprising means for providing a permanent compressive stress in the optical structure in the radial direction and/or in the axial direction, such compressive stress being sufficient to substantially increase the light output of said optical structure.

2. Side illuminating optical structure in accordance with claim 1, characterized in that one or more elongate structures such as fibers, filaments, yarns or tapes is or are helically wound under tension around said optical cable.

3. Side illuminating optical structure in accordance with claim 2, characterized in that the or each helically wound elongate structure comprises an endless glass fiber bundle or cable.

4. Side illuminating optical structure in accordance with claim 3, characterized in that the endless glass fiber bundle or cable is disposed within a transparent plastic sleeve or coating.

5. Side illuminating optical structure in accordance with claim 2, characterized in that the pitch of the helically wound elongate structures is constant along the length of the optical cable.

6. Side illuminating optical structure in accordance with claim 2, characterized in that the pitch of the helically wound fiber or fibers varies progressively from a first value to a second value over a predetermined repeat length of the optical cable and then repeats over such a plurality of repeat lengths.

7. Side illuminating optical structure in accordance with claim 2, characterized in that the or each helically wound elongate structure comprises a plastic optical fiber.

8. Side illuminating optical structure in accordance with claim 2, characterized in that a transparent plastic sleeve is provided around said helically wound optical cable.

9. Side illuminating optical structure in accordance with claim 2, characterized in that the tension in the helically wound elongate structure or structures changes progressively over a repeat length of the optical cable.

10. Side illuminating optical structure in accordance with claim 2, characterized in that a plurality of said elongate structures, for example two optical fibers, are helically wound under tension around said optical cable in opposite directions.

11. Side illuminating optical structure in accordance with claim 1, characterized in that said means comprises at least one elongate transparent sleeve surrounding and compressing said optical cable.

12. Side illuminating optical structure in accordance with claim 11, characterized in that said sleeve comprises an extruded sleeve extruded onto said optical cable with pre-stress.

13. Side illuminating optical structure in accordance with claim 12, characterized in that said rings are non-uniformly spaced apart.

14. Side illuminating optical structure in accordance with claim 11, characterized in that said sleeve comprises heat shrinkable material.

15. Side illuminating optical structure in accordance with claim 1, characterized in that said means comprises a braid woven under tension around said optical cable.

16. Side illuminating optical structure in accordance with claim 15, characterized in that said braid is formed of optical fibers, in particular plastic optical fibers.

17. Side illuminating optical structure in accordance with claim 16, characterized in that said braid comprises interwoven, endless glass fiber bundles or cables or coated bundles or cables.

18. Side illuminating optical structure in accordance with claim 16, characterized in that the fibers, bundles or cables forming said braid are woven under tension with progressively varying tension around said optical cable over a predetermined repeat length thereof.

19. Side illuminating optical structure in accordance with claim 15, characterized in that a plastic sleeve is provided over the outside of said braid, with or without pre-stress.

20. Side illuminating optical structure in accordance with claim 1, characterized in that said means comprises a plurality of preferably transparent rings compressing said optical cable placed apart at intervals over the outside of said optical cable.

21. Side illuminating optical structure in accordance with claim 20, characterized in that said rings are spaced at progressively changing intervals along said optical cable over a repeat length of said cable.

22. Side illuminating optical structure in accordance with claim 1, characterized in that the optical fibers are present in said optical cable, with permanent axial and/or radial compression as a result of the tensions applied during cabling.

23. Side illuminating optical structure in accordance with claim 22, characterized in that said common core is subjected to axial tension, or rotationally pre-stressed during cabling of said optical fibers about said common core, whereby an axial pre-load or a torsional pre-load is induced into said optical fibers on partial relaxation of said common core following manufacture thereof.

24. Side illuminating optical structure in accordance with claim 1, characterized in that said means comprises at least one transparent tape wound with tension helically around said optical cable.

25. Side illuminating optical structure comprising a braid of interwoven elongate fibers, at least some of which are optical fibers, at least some of said optical fibers having a core of a first plastic material having a first refractive index and a cladding of a second plastic material having a second refractive index lower than said first refractive index, said braid being woven under tension around an elongate core or core structure thereby compressing said elongate core or core structure, such compression creating a permanent stress sufficient to substantially increase the light output of said optical structure.

26. Side illuminating optical structure in accordance with claim 25, characterized in that in the structure said braid has a permanent residual tensile or compressive stress in the axial direction and/or in the radial direction.

27. Side illuminating optical structure in accordance with claim 26, characterized in that the permanent residual stress increases progressively over a repeat length of said optical structure.

28. Side illuminating optical structure in accordance with claim 25, characterized in that a plastic sleeve, in particular an extruded plastic sleeve, is present around the outside of said woven braid.

29. Side illuminating optical structure in accordance with claim 28, characterized in that said plastic sleeve applies a compressive stress to said braid.

30. Side illuminating optical structure in accordance with claim 25, characterized in that the pitch length or the tightness of the weave of the braid progressively changes over a repeat length of the optical structure.

31. Side illuminating optical structure in accordance with claim 25, characterized in that said elongate core or core structure comprises an optical fiber, or a bundle of optical fibers, or a cable of optical fibers or a filling member, for example in the form of a tube or rope, or in the form of a plurality of filaments or strands or yarns, and in that said elongate core or core structure also exhibits a residual tensile or compressive or torsional stress.

32. Side illuminating optical structure comprising a plurality of elongate optical fibers, each having a core of a first plastic material having a first refractive index and a cladding of a second plastic material having a second refractive index lower than said first refractive index, said fibers being cabled about a common core to form an optical cable, wherein said common core comprises three said optical fibers twisted together in a first direction, and wherein nine said fibers are cabled about said common core comprising the three said optical fibers, with said nine optical fibers being cabled around said common core in the same direction as said common core, thus forming a cable-like structure.

33. Side illuminating optical structure in accordance with claim 32, wherein six said cable-like structures are cabled about a single one of said cable-like structures forming a core cable and have a direction of cable twist the same as that of said cable-like structure.

34. Side illuminating optical structure in accordance with claim 32, wherein three said cable-like structures are cabled together in a direction corresponding to the direction of cable-twist of a single said cable-like structure, whereby to form a common core, and nine further ones of said cable-like structure are cabled around the last said common core, with a cable twist in the same direction as the cable twist of each said cable-like structure.

* * * * *